S. D. Humphrey,
Photographic Pictures,
Nº 17,152.            Patented Apr. 28, 1857.
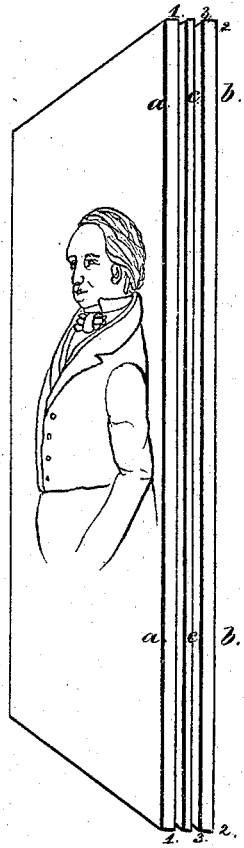
Witnesses:
Lemuel W. Serrell
Thomas G. Harold
Inventor:
S. D. Humphrey

UNITED STATES PATENT OFFICE.

S. DWIGHT HUMPHREY, OF NEW YORK, N. Y.

PREPARATION OF PHOTOGRAPHIC PICTURES, ENGRAVINGS, &c.

Specification of Letters Patent No. 17,152, dated April 28, 1857.

*To all whom it may concern:*

Be it known that I, S. DWIGHT HUMPHREY, of the city, county, and State of New York, have invented, made, and applied to use a new and useful Improvement in Photographic Pictures and Engravings; and I do hereby declare that the following is a full, clear, and exact description of the nature and extent of the said invention.

Photographic pictures and engravings have heretofore been taken and attached in precisely similar positions to two glasses; both pictures are rendered semitransparent by any suitable oil or varnish, and attached to the respective glasses by varnish or otherwise; one of the pictures is then to be colored up with any suitable paint and the other glass is then laid onto the said glass, with the uncolored photograph between the two glasses, that is to say the glass $a$, in the annexed drawing has the picture on the side 1, and the glass $b$, has the colored picture on the side 2, so that when the uncolored photograph is viewed, it receives a blended color from the colored picture. This device thus far is said to be the invention of Mr. John Bishop Hall of New York. Therefore I do not claim the same; but this manner of developing the pictures has some disadvantages or defects, viz., that the semitransparent picture which is viewed receives too marked and heavy colors from the second colored photograph, hence said second or colored photograph has to be painted with great care or the effect of the visible photograph is very much injured, and even when well colored, there is almost always two shadows visible from the outlines of both pictures being distinct.

The nature of my said invention as distinguished from the foregoing and as an improvement on the same, consists in introducing a semitransparent surface or medium between the two pictures, whereby the color imparted to the visible picture from the rear or colored photograph is beautifully blended, and all appearance from imperfection in the coloring prevented, beside which the second shadow or a distinct reflection from the rear colored photograph is intercepted, greatly adding to the beauty and perfectness of the photograph which is visible. To accomplish this purpose I introduce a separate ground glass ($c$) between the glasses $a$ and $b$, and said glass is to be ground more or less on one or both sides according to the degree of semitransparency required for showing the picture to the best advantage. In place of ground glass, a piece of very thin tracing cloth, tracing paper, or semiopaque glass or similar substance may be introduced but I prefer, in order to avoid weight and thickness, that the side 3 of the glass $b$, should be ground, which will show the photographic picture to the best advantage.

I do not claim two photographic pictures and a reflecting background, the rear photographic picture being colored, as the same was patented by J. Bishop Hall Jan 20th, 1857, but

What I claim and desire to secure by Letters Patent as an improvement of the said patent of J. B. Hall, is—

The use of a semi-transparent media interposed between two transparent photographic pictures or engravings for the purpose of blending the rays of light reflected from the rear colored photograph, and beautifying the picture substantially as specified.

In witness whereof I have hereunto set my signature this thirtieth day of December 1856.

S. D. HUMPHREY.

Witnesses:
LEMUEL W. SERRELL,
THOMAS G. HAROLD.